April 22, 1930.  R. MALE  1,755,963
DOUGH MOLDING MACHINE
Filed May 24, 1928  2 Sheets-Sheet 1
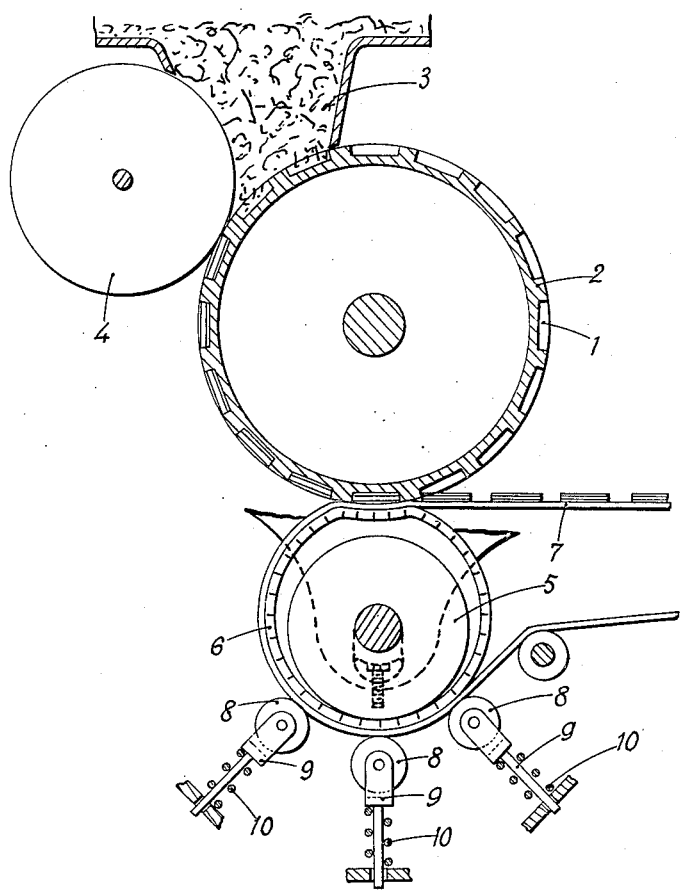
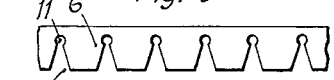
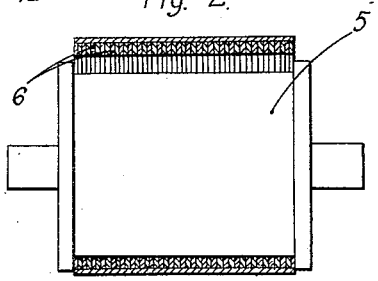
R. Male INVENTOR
By: Marks & Clark Attys.

April 22, 1930.  R. MALE  1,755,963
DOUGH MOLDING MACHINE
Filed May 24, 1928  2 Sheets-Sheet 2
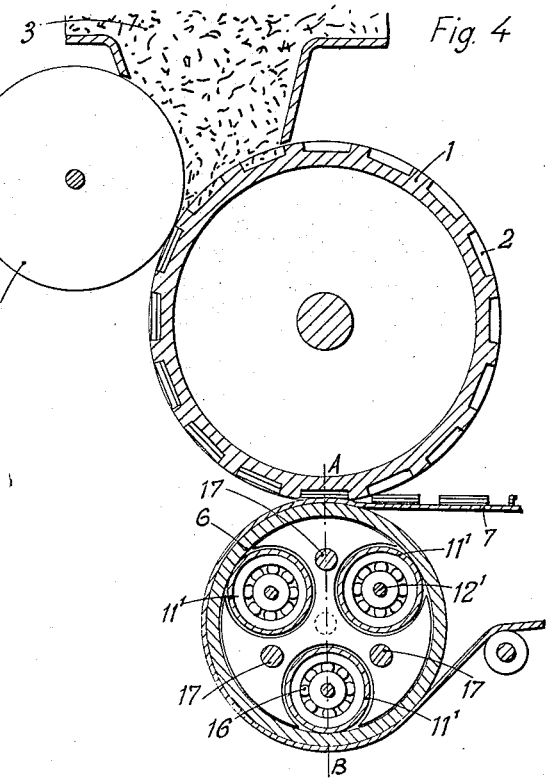
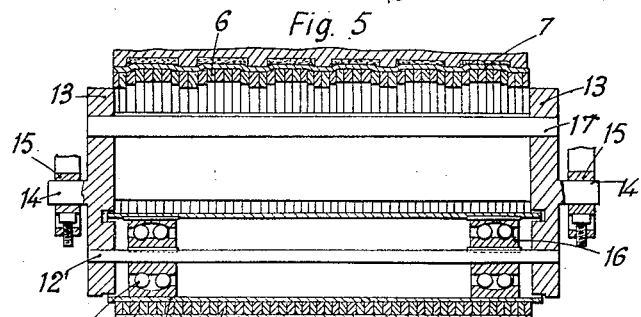
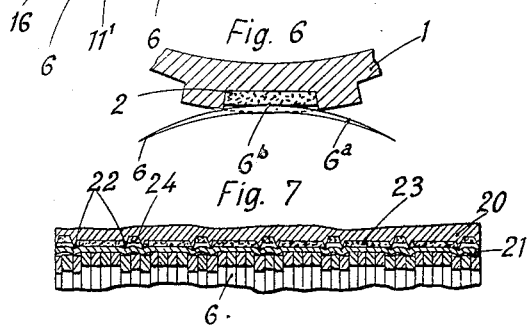
R. Male
INVENTOR
By: Marks & Clark
Attys.

Patented Apr. 22, 1930

1,755,963

UNITED STATES PATENT OFFICE

RENÉ MALE, OF ARCUEIL, FRANCE

DOUGH-MOLDING MACHINE

Application filed May 24, 1928, Serial No. 280,360, and in France September 26, 1927.

This invention relates to improvements in dough molding machines having rotary molding rollers and more particularly to improved means for detaching the molded dough portions from the molding roller.

It is known to effect such detachment of the molded dough portions by means of a resilient india-rubber roller, but this method has the disadvantage that the rubber quickly deteriorates under the action of fats contained in the dough.

According to the invention this disadvantage is avoided by substituting for the india-rubber roller, a roller which is built up of elastic metal rings arranged side by side and disposed eccentrically around the roller, thus constituting a cylinder capable of deformation.

Thus the improved means comprise a second roller located below the rotary molding roller, a plurality of thin elastic metal rings arranged eccentrically around the said second roller, said rings being of larger diameter than the roller, so that they contact with the endless belt conveyor only at the lower part of the periphery of the molding roller and a plurality of spring-operated rollers located below the second roller. The resilient metal rings are arranged parallel to each other side by side without any interspaces and are constrained to be shifted upwards by the action of spring operated rollers located below them in such way that they are brought into close contact with the conveyor belt, which passes over them at that part of the belt which is about to leave the molding roller.

According to the invention the new molding mechanism comprises resilient metal rings, as before, located side by side without any clearance, which, however, instead of being mounted with a certain play upon a single roller, are carried upon a plurality of rollers supported loose upon axles located 120° apart on plates constituting supports and held by trunnions in bearings, capable of being shifted in height so as to ensure contact of the rings and of the endless belt, which receives the molded biscuits, with the molding roller; the cavities in this latter in a modification may be provided with cutting edges.

Owing to this new arrangement, there is obtained a structure wherein, when the rings are carried forward by the endless belt, to which forward motion is communicated by the molding roller, without being in contact with the cavities filled with dough, the said rings are deformed owing to the pressure which is exerted upon them by adjusting the bearings of the trunnions; whilst, on the contrary, when the rings come opposite to the cavities filled with dough, they regain their normal shape and by penetrating into said cavities, they slightly compress the dough and operate upon the biscuits in such way as to oblige them to leave the molds and to fall on to the endless belt, which carries them out of the machine.

This arrangement makes it possible to dispense with the heavy pressure required to force the excentric rings against the molding roller, so as to touch closely a part of its periphery, and which strongly compresses the dough inside the molds whilst removing it therefrom.

In order that the invention may be well understood, it will be described with reference to the accompanying drawings, in which:

Fig. 1 is a section showing the apparatus diagrammatically.

Fig. 2 is a section showing the arrangement of the metal rings on the lower roller.

Fig. 3 shows the details of construction of the metal rings.

Fig. 4 is a section showing a diagrammatic view of another arrangement of the apparatus.

Fig. 5 is a longitudinal section showing the way in which the resilient rings are carried on their rollers and the latter in their bearings.

Fig. 6 is a view of a detail.

Fig. 7 shows how the rings may be applied to rolled dough.

Referring to Fig. 1, 1 is the molding roller provided with molds or cells 2 on its periphery. The dough issuing from the hopper 3 descends on to the molding roller 1 and is forced into the molds 2 by the pressure of the compressing drum 4.

At the lower part of the molding roller 1 there is located a second roller 5 on which are arranged a certain number of metal rings 6, the diameter of which is slightly greater than that of the roller 5.

These metal rings are very thin, for example less than $\frac{3}{32}$ inch and their height approximates to $1\frac{3}{32}$ inch. In order to render them elastic holes 11 (Fig. 3) are pierced through them and these holes are joined with the inner periphery by saw-cuts 12.

The rings 6 are placed upon the roller 5 side by side without interspaces, though they are still capable of being displaced independently in a vertical direction. The roller 5 is mounted in vertically adjustable bearings 5'.

The customary endless conveyor belt 7, upon which the molded dough portions are received on leaving the molding roller 1, passes around the rings 6.

Below the roller 5 are arranged rollers 8, bearing against the endless conveyor belt 7, and pivoted in forks 9 subjected to the action of springs 10, which by exerting pressure on the conveyor belt 7 and upon the elastic rings 6 forces the rings below the upper portion of the conveyor belt against the periphery of the molding roller 1. Owing to the elasticity of the rings 6, they are pressed up towards the molding roller 1 and cause the conveyor belt 7 to make a perfect contact upon a part of the periphery of the molding roller 1.

The aggregate of the rings 6 arranged side by side on the carrying roller 5 of smaller diameter constitutes an eccentrically mounted cylinder capable of deformation, owing to the thrust exerted by the rollers 8.

It is clear that under the action of this thrust exerted upwards by the rollers 8, the rings 6 in turn acting through the endless conveyor belt 7 upon the molding roller 1 will cause said belt to make intimate contact with the molded dough portions, which will then be detached and be carried by the belt out of the machine.

In the arrangement shown Fig. 4 the resilient metal rings 6 are carried on the periphery of rollers $11^1$ supported by plates 13 through the intermediary of shafts $12^1$ provided with ball bearings 16. The rollers $11^1$ of which three are shown by way of example are carried loose so as to be able to rotate freely on their shafts $12^1$, which are carried spaced circumferentially 120° apart on the supporting plates 13. Struts 17 connecting the plates 13 give perfect rigidity to the whole mechanism. Each of the plates 13 is provided with a central trunnion 14 carried in bearings 15, mounted in the brackets of the machine and capable of being operated in such way as to ensure the contact of the resilient rings 6 or rather of the endless belt 7 surrounding them, with the molding roll 1.

There is thus obtained a cylinder consisting of deformable rings capable of moving independently of each other, the theoretical axis of which cylinder is constituted by the trunnions 14 running in the bearings 15 adjustable in height.

The aggregate of the resilient rings 6 being carried by the bearings 15, through the intermediary of the plates 13 and the trunnions 14, the bearings 15 are operated in such way as to bring the rings 6 up towards the molding roller 1, without however causing them to be deformed, the endless belt 7 being interposed between the rings 6 and the said roller 1.

The rotation of the molding roller 1 occasions the advance of the endless belt 7, which in turn carries forward the resilient rings 6, rotating on the rollers $11^1$. When the resilient rings 6 bring the endless belt 7 into contact with the spaces existing between the molds or cavities 2, they are deformed against the periphery of the molding roller, but when they are opposite a cavity or mold, they tend owing to their elasticity to regain their original shape, so that the parts of the rings coming successively in front of a cavity, expand and therefore engage therein.

By engaging in the cavity the resilient rings slightly compress the dough and at the same time detach the molded biscuit and make it fall upon the conveyor belt 7.

On referring to Fig. 6 it will be seen how the resilient rings 6 operate, either when they are in contact with the periphery of the molding roller 1, that is to say with the spaces separating the cavities, or when they are in front of a cavity 2. In order to make the explanation more clear the conveyor belt 7 has been omitted from Fig. 6. It is seen that the resilient ring $6^a$ in contact with the periphery of the molding roller is deformed up to the maximum pressure, which is imparted to it by the pressure of the rings against the roller by the bearings 15.

The resilient ring $6^b$ opposite the cavity 2 has regained substantially its original shape, owing to the compression exerted upon the dough filling the cavity, but, notwithstanding it exerts sufficient pressure for detaching the biscuit from the cavity.

Owing to the rollers $11^1$, which support the resilient rings 6, being carried on shafts 17 with interposed ball bearings 16, when said rings are pressed against the roller 1, owing to the pressure exerted at the points where they touch the rollers $11^1$, these will rotate on their shafts and will thus aid the rotation of the rings.

This construction has the advantage of obviating the use of the powerful compression absolutely necessary when rubber rollers are used for detaching the biscuits from the molds, which has the disadvantage of exerting too great a pressure upon the dough, so that it is compressed too much inside the mold, before being ejected on to the conveyor belt.

In certain cases it will be advantageous to shift the whole of the resilient rings 6 on the trunnions 14 so that the vertical axis A B passing between the upper rollers 11 may be slightly shifted to right or left, according to the nature of the dough used.

This arrangement of deformable resilient rings which has just been described as applied to the molding of dough, may be applied equally well to rolled dough, that is to say to sheets of dough, which are applied in any way upon a roller, the cavities in which latter are provided with cutting edges, so as to cut out the dough when it is pressed by the rings. An arrangement of this kind is shown diagrammatically in Fig. 7. The sheet of dough is applied against the cylinder 20 by the endless belt 21 upon which the resilient rings 6 act. Under the pressure exerted by said rings, the sheet of dough is cut out by the cutting edges 22 of the cavities 23 and the biscuits thus shaped are received on the conveyor belt. The spaces 24 between the cavities 23 are so dimensioned that their depth is greater than that of the cavities, for the purpose of preventing the strips of dough detached by cutting out the biscuits from being stuck by the rings on to the conveyor belt. It may be seen from Fig. 7 that though the resilient rings 6 operate upon the dough filling the cavities, they have no effect upon the dough in front of the spaces 24, so that the resilient rings detach the biscuits from the cavities and place them upon the conveyor belt, whilst owing to the depth of the grooves or spaces 24, they push back the waste dough but do not detach it. This waste it is true falls on to the belt but without sticking to it, so that it is easy by suitable means, such as knives or rakes, to guide it out of the machine, where it may be collected, whilst the biscuits are led into the oven.

Claims:

1. In a dough-working machine including a rotary working roller having recesses therein, and an endless belt cooperating therewith, the combination with an apparatus for detaching portions of the dough from the recesses of the rotary working roller onto said endless conveyor belt, comprising a deformable cylinder coacting with that part of the endless conveyor belt which passes under the rotary working roller, the said deformable cylinder consisting of a plurality of relatively thin resilient metal rings arranged side by side in contacting relation and each capable of radial deformation, means for supporting the said ring, and means for adjusting the last-mentioned supporting means so that the said rings force the endless conveyor belt into engagement, the lower part of the periphery of the working roller.

2. An apparatus as claimed in claim 1, said rings being provided with transverse holes united with the inner periphery of said ring by means of transverse cuts.

3. An apparatus as claimed in claim 1, a plurality of supporting rollers engaging the inner periphery of the deformable cylinder, shafts about which the supporting rollers rotate freely, ball bearings interposed between the shafts and the rollers, supporting end plates for the said shafts, central trunnions integral with the said end plates.

In testimony whereof I affix my signature.

RENÉ MALE.